No. 708,567. Patented Sept. 9, 1902.
W. A. R. LOOSE.
APPARATUS FOR SEPARATING METALS FROM THEIR ORES.
(Application filed Sept. 9, 1901.)
(No Model.) 2 Sheets—Sheet 1.
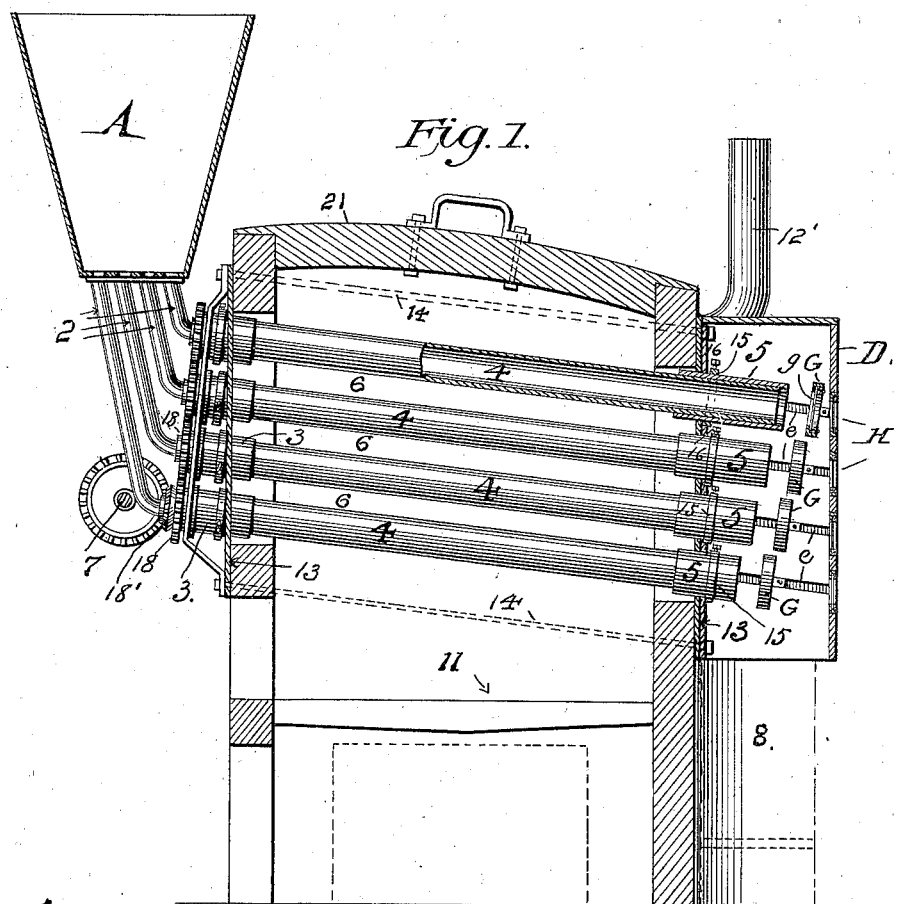
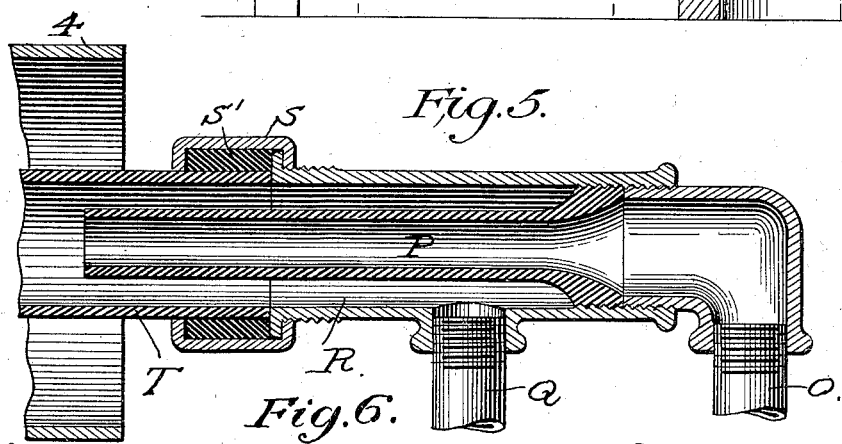
Witnesses:
C. W. Fowler
Nowell Battle
Inventor:
Warren A. R. Loose
by T. Walter Fowler
his atty No. 708,567. Patented Sept. 9, 1902.
W. A. R. LOOSE.
APPARATUS FOR SEPARATING METALS FROM THEIR ORES.
(Application filed Sept. 9, 1901.)
(No Model.) 2 Sheets—Sheet 2.
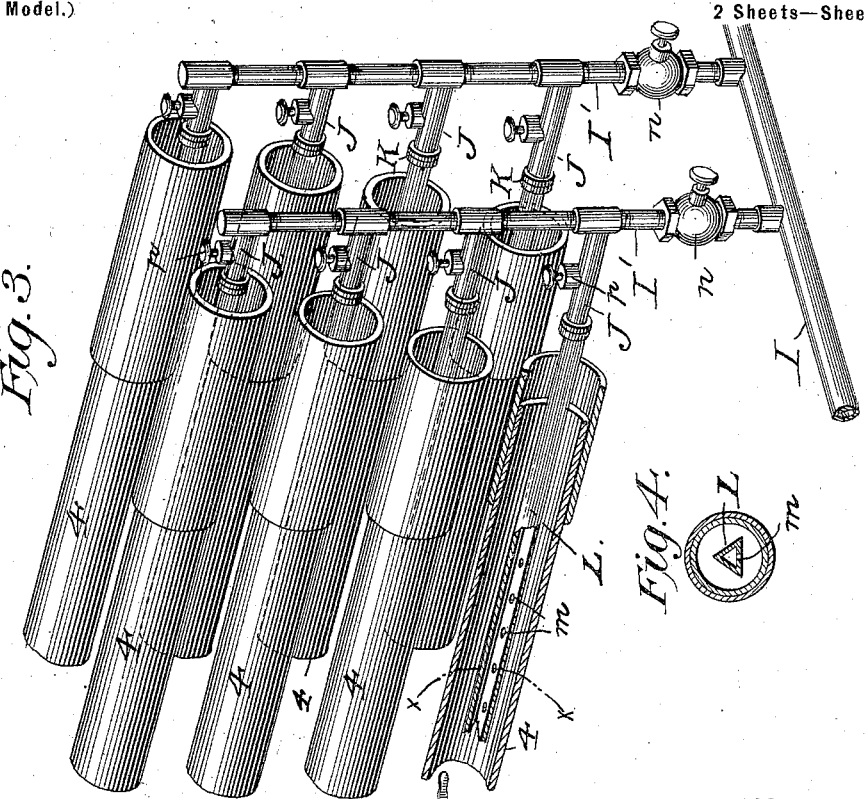
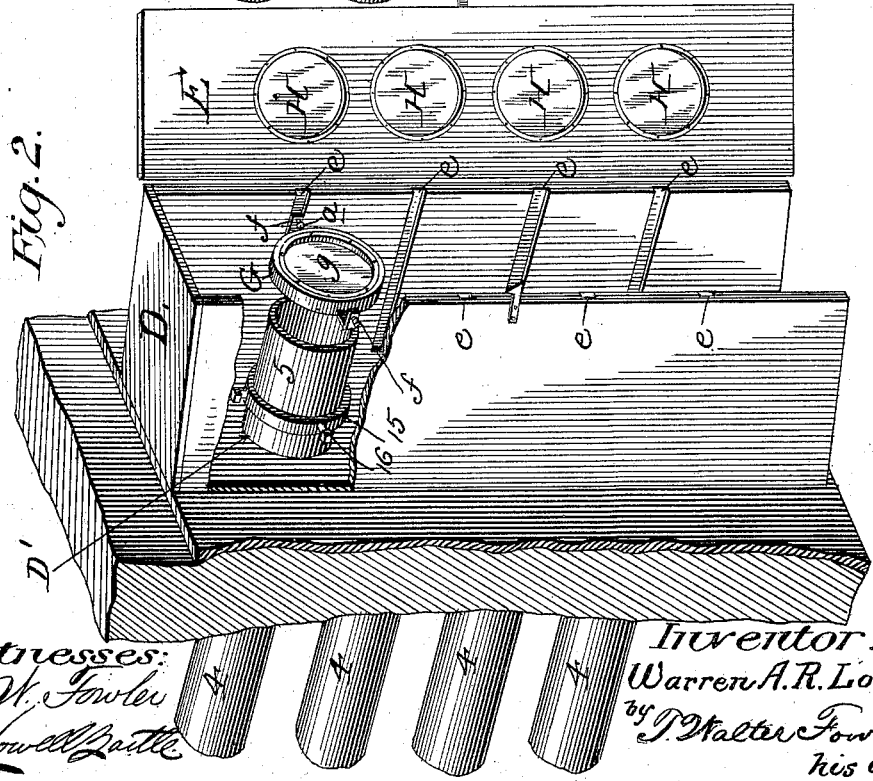
Witnesses:
C. W. Fowler
Howell Battle
Inventor:
Warren A. R. Loose
by T. Walter Fowler
his atty

UNITED STATES PATENT OFFICE.

WARREN A. R. LOOSE, OF PROVO, UTAH.

APPARATUS FOR SEPARATING METALS FROM THEIR ORES.

SPECIFICATION forming part of Letters Patent No. 708,567, dated September 9, 1902.

Application filed September 9, 1901. Serial No. 74,826. (No model.)

*To all whom it may concern:*

Be it known that I, WARREN A. R. LOOSE, a citizen of the United States, residing at Provo, in the county of Utah and State of Utah, have invented new and useful Improvements in Apparatus for Separating Metals from Their Ores, of which the following is a specification.

My invention relates to improvements in furnaces for the treatment of copper and other ores. It is an improvement on the invention shown and described in my former patent, No. 674,563, dated May 21, 1901, wherein is employed a plurality of revoluble muffles, through which the finely-crushed ore is made to travel and wherein said ore is submitted to the required degree of heat to effect the reduction of the carbonates and oxids of copper to metallic copper. The invention is, however, not restricted to the use of copper ores, but will be found of great value in other metallurgical operations requiring continuous treatment and where it is desired to apply the heat exteriorly or interiorly to the reducing-chamber or containing vessel.

The present invention consists of the parts and the constructions and combinations of parts, which I shall hereinafter describe and claim.

Referring to the accompanying drawings, forming part of this specification, and in which similar characters of reference indicate like parts, Figure 1 is a vertical sectional view of a furnace embodying my invention. Fig. 2 is an enlarged detail in perspective, showing a vertical row of muffles, the housing or inclosure therefor, and one of the shields in line with the discharge end of the muffle. Fig. 3 shows two vertical rows of muffles and means for admitting gas thereto. Fig. 4 is a cross-section on the line $x$ $x$ of Fig. 3. Fig. 5 is a modification showing an injector-burner to be hereinafter described. Fig. 6 is a modification to be referred to.

In the separating of copper from its ore the ore is first crushed to the desired fineness and is then reduced by a suitable reducing agent. For instance, the finely-divided ore may be mixed with from one to ten per cent. of pulverized charcoal, coke, sawdust, or other suitable carbonaceous material or hydrogen gas, or the vapor of a hydrocarbon product may be employed as the reducing agent, as I will presently indicate. When using the mixture of ore and carbonaceous material, said mixture is delivered into an appropriate hopper A. Then it passes down through suitable pipes or conduits 2 and the cogged sleeves 3 into the muffles 4, which latter extend through the furnace and the walls thereof in vertical and horizontal rows, with the discharge ends of one vertical row projecting beyond the corresponding ends of the muffles beneath, said muffles being sufficiently inclined to permit the ore to flow therethrough by gravitation.

Upon the lower ends of the muffles are fitted the plain sleeves 5, said sleeves extending through the plate 13 and into the brick lining of the furnace and are held in place on the muffles by means of collars 15, held by set-screws 16 or equivalent fastenings, which pass through appropriate perforations in the sleeves and bind upon the muffles, said collars bearing against the plate 13 and preventing longitudinal movement of the muffles. The ore in the muffles is subjected to a heat sufficient to reduce all the copper compounds to metallic copper, and the flame of the furnace passes through the flues or spaces 6 on the outside of the muffles and subjects the muffles to an intense heat—a heat sufficient to reduce the carbonates and oxids of copper to metallic copper. The muffles, which are made of suitable heat-resisting material, as fire-clay, platinum, iron, &c., are made to rotate by means of a driving-shaft 7 and suitable gearing, including bevel and square gears on the sleeves 3, the gears 18 meshing with each other and the bevel-gear 18' meshing with a similar gear on the driving-shaft 7, whereby all the muffles are revolved in unison and by the same power. The discharge of the reduced material is regulated according to the inclination of the muffles and the rapidity of their revolution, and the discharged heated material is preferably delivered into agitators or crushers of any desired form and containing water, the sudden immersion in which causes a further disintegration of the particles and the liberation of any remaining free metallic copper. It also prevents the reoxidation of the copper, which would occur if the ore were allowed to cool slowly. From the agitators the material may be discharged and the metal collected upon concentrators or in any other desired manner.

Any appropriate fuel may be used with this furnace. In Fig. 1 I show a fire-box 11 and its position with relation to the muffles. The foregoing features, together with the arrangement of furnaces in series, having as many auxiliary fire-boxes as desired and a central common chimney, and the bolts 14, by which the plates 13 are held together, the door 21, and smoke-stack 12', are substantially like the corresponding parts shown, described, and claimed in my aforesaid former patent, No. 674,563, May 21, 1901, and the essential improvements upon which I will now describe.

The projecting discharge ends of each vertical line of muffles are inclosed by a suitable housing or box D, closed on all sides except the bottom, the back of the box or housing having openings D' to receive and fit over the ends of the muffles and the front, including a hinged door E, with appropriate latching or securing means, as shown in Fig. 2. The material discharged from each vertical row of muffles enters the housing or box D and is delivered through the lower end thereof into the aforesaid agitators. In the opposite inner sides of the housing or box D grooves or other appropriate guides $e$ are formed, in which are slidably mounted lugs $f$, projecting from a shield, including an annular ring or band G, located just in front of the discharge end of each muffle, said ring or band having an open center, in which is placed and secured a sheet of mica $g$ or other transparent heat-resisting material. The shield may be adjusted toward and from the end of the muffle, and it may be fixed in any adjusted position by means of set-screws $a$, as shown in Fig. 2, and inspection of the interior of the muffle is afforded through the mica sheet, which serves as a sight-opening and also protects the face of the operator viewing the interior from the intense heat.

Another and essential object of the shield is to exclude the atmosphere from the muffles and enable the reducing agent to take up the oxygen liberated from the ore by the heat, the internal pressure of the gases so liberated being such as to hold back and prevent the entrance of outside air at atmospheric pressure through the space left between the shield and the discharge end of the muffle. In the door of the housing or box are also formed sight-openings H, substantially similar to those before described.

In Fig. 3 I illustrate a means whereby gas may be successfully used as the agent for reducing the ore to metallic copper. In said figure the gas-supply pipe I has a number of branches or vertical extensions I', corresponding to the number of vertical rows of muffles, one of said extensions or branches being so located with respect to each vertical row of muffles that a lateral J therefrom lies longitudinally in line with each muffle and is provided with any well-known and appropriate form of coupling K, to which a burner L is detachably connected. This burner I construct of material capable of resisting intense heat, and as a suitable material I preferably construct the burner of graphite, which is light and capable of resisting intense heat and of maintaining itself straight without the warping or buckling which is incidental to metal pipes and burners generally. The cross-sectional form of the burner may be as desired. In Figs. 3 and 4 the burner is shown as of substantially pyramidal or triangular form, whereby its inclined sides afford no place for lodgment for the ore passing through the muffle, and no sufficient weight is placed upon the graphite burner to cause it to fracture or to be bent out of a substantially straight line. The burner L therefrom impinges directly upon and reduces the ore during the passage of said ore through the muffle. The amount of gas admitted to the vertical gas-pipes I' may be regulated by valves, as at $n$, and the flow of gas through any or all of the laterals J may be likewise regulated and any one or more of the burners cut out at pleasure by means of valves, as at $p$. When using the housings or boxes and the adjustable shield in connection with the gas-supply, as above described, the pipes I' will extend in the end of the housing and the laterals J will pass through the center of the shield G', as shown in Fig. 6, said shield being in this instance made in two parts or divided transversely, so that it may be made to embrace the lateral, and the parts united by any well-known form of fastening. The gas-supply pipes may be used without the shield and in the manner shown in Fig. 3, and the pipes I' may be truly vertical, as shown in said figure, but are preferably inclined to correspond with the varying projection of the discharge ends of the muffles.

In Fig. 5 I illustrate a form of injector-burner, in which case gas from a supply enters the pipe O and passes through a burner-tube P, composed, preferably, of graphite, and air is admitted through pipe Q into the burner-casing R and mixes with the gas at the forward end of the tube P. The burner-casing carries a sleeve S, containing a packing S', and through the center of the sleeve is passed a burner-tube T, also preferably of graphite, said tube passing into the muffle, and a close slip-joint is made by screwing up the sleeve S, and thereby compressing the packing about the end of the tube T.

Having thus described my invention, what I claim as new, and desire to secure by Letters Patent, is—

1. In an apparatus for separating metals from their ores, the combination with a muffle, of a shield adjustable toward and from the discharge end of the muffle and having a sight-opening to afford inspection of the interior of the muffle while the ore is being reduced, and means inclosing the end of the muffle and the shield.

2. In an apparatus for separating metals from their ores, the combination with a revoluble muffle, of a shield separated from the end of, and movable in line with, the discharge end of the muffle and having a transparent portion to permit inspection of the interior of the muffle during the reducing operation, and an inclosure for the end of the muffle and the shield.

3. In an apparatus for separating metals from their ores, the combination with an inclined muffle through which the ore passes, of a shield separated from the end of, and movable in line with, the discharge end of the muffle, and having a transparent portion, means whereby the shield may be adjusted toward and from the end of the muffle, and a housing inclosing the discharge end of the muffle and the shield.

4. In an apparatus for separating metals from their ores, the combination with a muffle, of a shield in line with, and separated from, the end of the muffle and including a ring or band and a transparent sheet held thereto, and means whereby the shield may be adjusted to and from the discharge end of the muffle.

5. In an apparatus for separating metals from their ores, the combination with the muffles, of an inclosure or housing for the discharge ends of said muffles, said housing or inclosure being closed on all sides, except the bottom, and having openings containing transparent material, and a shield interposed between the housing and the discharge end of the muffle, and having a transparent portion in line with the openings in said housing.

6. In an apparatus for separating metals from their ores, the combination with a vertical row of muffles, of an inclosure or housing covering the discharge ends of all of the muffles said inclosure having closed sides and top, an open bottom and a hinged door, said door having glazed sight-openings, one in line with each of the muffles.

7. In an apparatus for separating metals from their ores, the combination with a vertical row of muffles, of an inclosure or housing for the discharge ends thereof and having internal guides, and a shield fitting said guides in line with the muffles and adjustable with relation to the discharge ends of the muffles.

8. In an apparatus for separating metals from their ores the combination with a muffle, of a burner-tube entering directly therein and composed of graphite said tube having inclined sides converging upwardly.

9. In an apparatus for separating metals from their ores the combination with the muffle, of a burner-tube entering the muffle and having substantially a triangular form in cross-section.

In testimony whereof I have hereunto set my hand in presence of two subscribing witnesses.

WARREN A. R. LOOSE.

Witnesses:
T. W. FOWLER,
CHAPMAN W. FOWLER.